United States Patent [19]
Motoyama

[11] Patent Number: 4,461,967
[45] Date of Patent: Jul. 24, 1984

[54] SUPPORT FOR A ROTATIONAL SPEED DETECTING MECHANISM ON A FLAT MOTOR

[75] Inventor: Kazuyasu Motoyama, Tokyo, Japan

[73] Assignee: Olympus Optical Company Limited, Tokyo, Japan

[21] Appl. No.: 351,894

[22] Filed: Feb. 24, 1982

[51] Int. Cl.³ .............................................. H02K 11/00
[52] U.S. Cl. .................................... 310/268; 310/156; 360/73
[58] Field of Search ...................... 310/68 R, 156, 152, 310/268; 360/73

[56] References Cited
U.S. PATENT DOCUMENTS

| 4,295,171 | 10/1981 | Hirota et al. | 360/73 |
| 4,359,657 | 11/1982 | Matsumoto et al. | 310/156 |
| 4,366,405 | 12/1982 | Schmider | 310/268 |

Primary Examiner—William M. Shoop
Assistant Examiner—D. L. Rebsch
Attorney, Agent, or Firm—Toren, McGeady and Stanger

[57] ABSTRACT

A rotary machine having a rotating detection mechanism for detecting rotational speeds as a frequency signal is disclosed. The rotary machine comprises a rotary machine body, a disk shaped magnet tightly fitted onto a rotating shaft projected from the body, a ring shaped coil unit loosely mounted around the disk magnet for generating a frequency output corresponding to rotational speeds of the body, and a ring shaped member supporting the ring coil unit around the disk magnet.

1 Claim, 3 Drawing Figures

SUPPORT FOR A ROTATIONAL SPEED DETECTING MECHANISM ON A FLAT MOTOR

BACKGROUND OF THE INVENTION

The present invention relates to a rotary machine having therein a rotating detection mechanism for detecting rotational speeds or the number of revolutions as a frequency signal.

Nowadays, in order to reduce the thickness of electrical machinery and apparatus having therein a rotary machine, for example, a cassette tape recorder which is convenient for portable use, as shown in FIG. 1, provision is made of a flat coreless motor 1 as a rotary machine for running a magnetic tape with a constant speed, and the coreless motor 1 is arranged by the side of a cassette chamber for receiving a tape cassette 2. The thickness of the cassette tape recorder depends on the thickness of the flat coreless motor 1.

In order to run the magnetic tape with a constant speed, the flat coreless motor comprises a servo circuit, by which the difference between the previously set reference rotational speed and the actual rotational speed is measured or detected, and the rotational speed is automatically adjusted until the detected difference becomes zero.

There has been provided, as such a motor, a rotary machine in which a frequency generator for generating a frequency output signal corresponding to the rotational speeds is built in the motor body. This rotary machine is so constructed that a disk shaped armature magnet is tightly fitted onto a rotor shaft of the motor, and a coil unit is loosely mounted around the armature magnet.

In such a construction, however, the frequency generator is incorporated in the motor body so that the thickness of the coreless motor is increased by the part occupied with the frequency generator and can not be made equal to the thickness of the tape cassette. Therefore, it is impossible to make the cassette tape recorder thin.

SUMMARY OF THE INVENTION

It is an object of the present invention to overcome the above described disadvantages of the conventional rotary machine.

It is another object of the present invention to provide a rotary machine constructed by tightly fitting a disk shaped magnet onto a rotating shaft projected from the rotary machine body, and loosely mounting a ring shaped coil unit for generating a frequency output signal corresponding to rotational speeds of the rotary machine body around the disk magnet, thereby to make the thickness of the rotary machine body thin and to decrease the thickness of the electric machinery and apparatus.

According to the present invention there is provided a rotary machine comprising a rotary machine body, a disk shaped magnet tightly fitted onto a rotating shaft projected from the body, a ring shaped coil unit loosely mounted around the disk magnet for generating a frequency output signal corresponding to rotational speeds of the body, and a ring shaped member supporting the ring coil unit around the disk magnet.

The rotary machine body is made as thin as possible.

BRIEF DESCRIPTION OF THE DRAWING

These and other features and advantages of the present invention will become readily apparent from the following detailed description of one embodiment of the present invention, particularly when taken in connection with the accompanying drawings wherein like reference numerals designate like or functionally equivalent parts, and wherein.

DESCRIPTION OF THE PREFERRED EMBODIMENT

Figure 2:
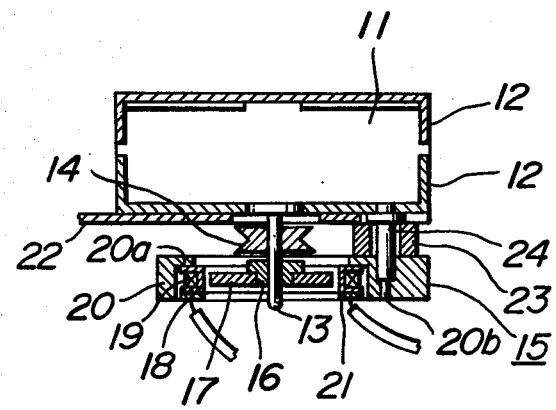
FIG. 2 is a longitudinal sectional view showing a construction of one embodiment of a rotary machine according to the present invention.

Referring now to the drawings, there is shown an embodiment of a rotary machine according to the present invention. In this embodiment the present invention is applied to a superminiature cassette tape recorder which is convenient for portable use. In FIG. 2 a rotary machine body 11 is incorporated in shield casings 12, 12. As the rotary machine body, use is made of a flat coreless motor having a thickness substantially equal to the thickness of a tape cassette in order to make the cassette tape recorder thin. A motor pulley 14 is tightly fitted onto a rotating shaft 13 projected from the motor body 11, and a frequency generator 15 for generating frequency signal outputs corresponding to the rotational speeds of the motor is on shaft 13 as a rotating mechanism for detecting rotational speeds or the number of revolutions of the flat coreless motor body 11.

The frequency generator 15 comprises a disk shaped magnet 17 which is tightly fitted onto the rotating shaft 13 through a collar 16, a ring shaped bobbin 18 having an inner diameter slightly larger than an outer diameter of the magnet 17, a coil unit 19 wound on the bobbin 18 and loosely mounted around the magnet 17 for generating frequency signals corresponding to the rotational speeds of the motor body 11, i.e. the number of revolutions of the magnet 17, for example, for generating a given number of pulses per revolution of the magnet 17, and a ring shaped support member 20 having a flange 20a for supporting the bobbin 18 with the coil unit 19 thereon around the magnet 17. An output terminal 21 of the coil unit 19 is secured to one side of the bobbin 18, an adapter plate 22 has the motor body 11 mounted thereon by the side of the cassette chamber of the tape recorder, a sleeve 23 interposed between the adapter plate 22 and the support member 20 limits the support member 20 to a given position, and a fitting shaft 24 fixes the support member 20 to one of the shield casings 12 under the motor body 11 through the sleeve 23 by means of a calker.

Figure 3:
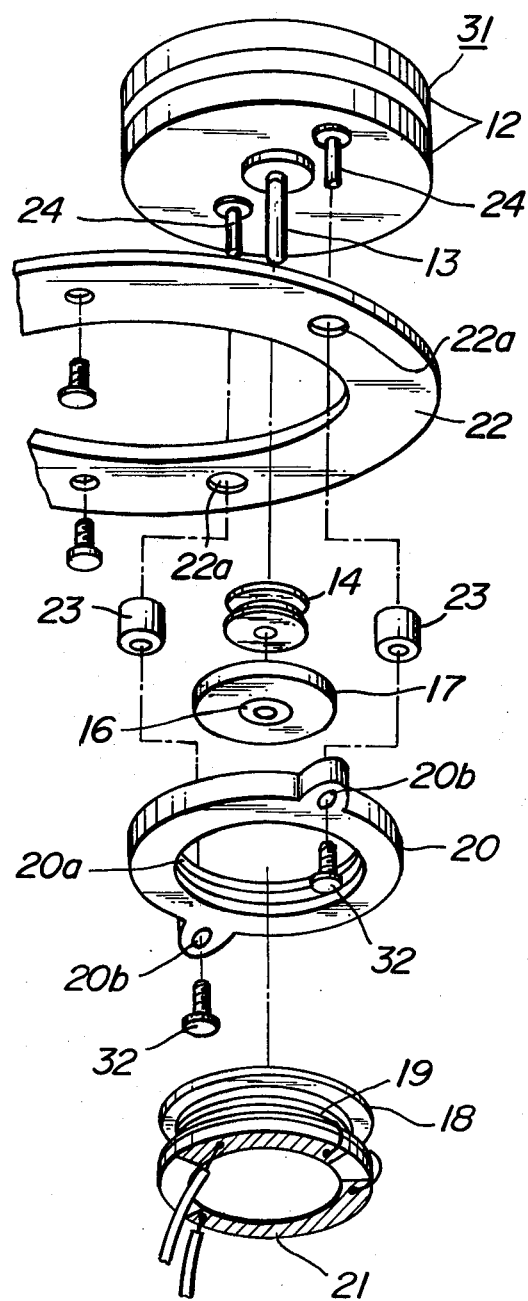
FIG. 3 is an enlarged exploded perspective view explaining the manner of assembling the rotary machine shown in FIG. 2.

Next, the assembly of the rotary machine is described with respect to FIG. 3. The motor pulley 14 is tightly fitted onto the rotating shaft 13 of a flat coreless motor 31 incorporated in the shield casings 12, 12 and then the magnet 17 is tightly fitted onto the rotating shaft 13 through the collar 16 under the pulley 14. The fitting shafts 24, 24 are fitted in two fitting holes 22a, 22a formed in the U shaped adapter plate 22. The fitting shafts 24, 24 are provided with threaded openings.

Then, the sleeves 23, 23 are fitted onto the fitting shafts 24, 24, respectively, and the fitting holes 20b, 20b formed in the support member 20 are also fitted onto the fitting shafts 24, 24, respectively. As shown in FIG. 2 the fitting hole 20b formed in the support member 20 has an inner diameter which becomes small in the course of hole length so as not to pass the shaft 24 through the hole 20b. Therefore, the support member 20 is fixed to the under side of the flat coreless motor 31 through the sleeve 23 and the adapter plate 22 by screwing a screw 32 into the fitting shaft 24 through the small inner diameter portion of the hole 20b. The bobbin 18 having the coil unit 19 wound thereon is fitted into the support member 20 from underside and bonded to the flange portion 20a of the support member 20 by adhesives after adjusting a gap between the magnet 17 and the bobbin 18 so as not to touch the bobbin 18 to the magnet 17.

Figure 1:
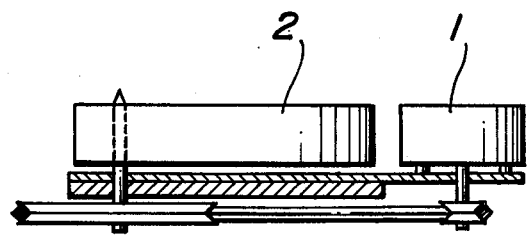
FIG. 1 is a partially sectional side view showing a construction of a conventional rotary machine for use in a cassette tape recorder.

According to such construction when the flat coreless motor body 11 is by the side of the cassette chamber in the same manner as in FIG. 1, the frequency generator 15 can be under the cassette chamber so that the thickness of the flat coreless motor 11 can also be made equal to that of the tape cassette. Therefore, it is possible to make the cassette tape recorder thin, as compared with the conventional one.

The frequency generator 15 can be detachably fitted onto the rotating shaft 13 projected from the motor body 11 so that it is possible to carry out an exchange of the frequency generator 15 easily and to easily mount the frequency generator 15 to a motor having no rotating detection mechanism.

The frequency generator 15 is mounted to the motor body 11 so as to project therefrom so that it is easy to change the fitting position of the frequency generator 15 along the rotating shaft 13, and to carry out a change in the dimensions of the frequency generator 15 without being subject to the dimensions of the body 11.

It is further understood by those skilled in the art that the foregoing description is a preferred embodiment of the disclosed device and the present invention is not limited thereto and that various changes and modifications may be made in the present invention without departing from the spirit and scope thereof.

For example, it is possible to apply other rotary machines instead of the flat coreless motor, as the rotary machine body.

What is claimed is:

1. A rotary machine comprising a rotary machine body, said rotary machine body comprising a flat coreless motor having a planar first side and an opposite planar second side, said motor including a rotatable shaft projecting from said first side of said motor, a disk shaped magnet tightly fitted coaxially onto said rotatable shaft a certain distance from said first side of said motor, a ring shaped coil unit generally coaxial with and spaced radially outwardly from the radially outer circumferential periphery of said disk shaped magnet so that said coil unit encircles the circumferential periphery of said disk shaped magnet for generating a frequency signal output corresponding to rotational speeds of said shaft, a ring shaped supporting member arranged to support the ring shaped coil unit coaxially around the disk shaped magnet wherein the disk shaped magnet is free to rotate relative to the coil unit so as to generate said frequency output, said supporting member having an annular flange extending radially inwardly between said coil unit and said first side, the radially inner edge of said flange being spaced radially outwardly from said rotatable shaft, an adapter plate mounted on said first side of said motor so that said adapter plate is spaced from said supporting member, means for detachably fastening said ring shaped supporting member to said first side of said motor so that the coil unit is supported in operative relation to the disk shaped magnet, and said detachable fastening means including means located between said adapter plate and said supporting member so that said supporting member is spaced in a given position from said adapter plate.

* * * * *